US006918825B2

(12) United States Patent  
Conaway

(10) Patent No.: US 6,918,825 B2  
(45) Date of Patent: Jul. 19, 2005

(54) POULTRY DE-FEATHERING APPARATUS AND METHOD

(76) Inventor: Everett T. Conaway, P.O. Box 240, Seaford, DE (US) 19973

( * ) Notice: Subject to any disclaimer, the term of this patent is extended or adjusted under 35 U.S.C. 154(b) by 0 days.

(21) Appl. No.: 10/647,211

(22) Filed: Aug. 26, 2003

(65) Prior Publication Data

US 2005/0048888 A1 Mar. 3, 2005

(51) Int. Cl.[7] .............................................. A22C 21/02

(52) U.S. Cl. .............................. 452/88; 452/89; 452/91

(58) Field of Search .............................. 452/94, 95, 96, 452/97, 71, 75, 82, 83, 84, 85, 86, 87, 88, 89, 90, 91, 92, 93

(56) References Cited

U.S. PATENT DOCUMENTS

| | | | | |
|---|---|---|---|---|
| 564,587 A | * | 7/1896 | Black | 451/467 |
| 663,449 A | * | 12/1900 | Lebiedzinski | 452/95 |
| 1,217,393 A | * | 2/1917 | Berg | 452/92 |
| 1,502,535 A | | 7/1924 | Young | |
| 2,389,404 A | | 11/1945 | Barker | |
| 2,422,608 A | | 6/1947 | Albright | |
| 2,512,843 A | | 6/1950 | Tomlinson | |
| 2,743,477 A | | 5/1956 | Barker et al. | |
| 2,813,298 A | | 11/1957 | Barker et al. | |
| 2,896,249 A | | 7/1959 | Pitts et al. | |
| 2,908,033 A | | 10/1959 | Zebarth | |
| 2,977,628 A | * | 4/1961 | Barker et al. | 452/76 |
| 3,002,219 A | | 10/1961 | Bried | |
| 3,068,509 A | | 12/1962 | Pitts et al. | |
| 3,132,372 A | * | 5/1964 | Masters et al. | 452/90 |
| 3,236,656 A | * | 2/1966 | Wittig | 426/272 |
| 3,471,893 A | | 10/1969 | Zebarth et al. | |
| 3,537,128 A | | 11/1970 | Zebarth et al. | |
| 3,585,675 A | * | 6/1971 | Crane | 452/91 |
| 3,596,309 A | * | 8/1971 | Vertegaal | 452/89 |
| 3,599,278 A | | 8/1971 | Crane | |
| 3,628,218 A | * | 12/1971 | Simonsen et al. | 452/173 |
| 3,969,790 A | * | 7/1976 | Smorenburg | 452/75 |
| 4,179,772 A | * | 12/1979 | Harben, Jr. | 452/90 |
| 4,292,709 A | | 10/1981 | van Mil | |
| 4,329,760 A | * | 5/1982 | van Mil | 452/91 |
| 4,514,879 A | * | 5/1985 | Hazenbroek | 452/91 |
| 5,106,333 A | | 4/1992 | Van Dorn et al. | |
| 5,184,973 A | * | 2/1993 | Orlando et al. | 452/125 |
| 5,489,236 A | | 2/1996 | Neal et al. | |
| 5,538,467 A | * | 7/1996 | Wodajo | 452/119 |
| 5,853,320 A | * | 12/1998 | Wathes et al. | 452/88 |
| 5,863,245 A | | 1/1999 | Elduayen et al. | |
| 5,944,595 A | | 8/1999 | Prothro | |
| 6,001,012 A | | 12/1999 | Ford | |
| 6,168,510 B1 | | 1/2001 | Ford | |
| 6,605,308 B2 | * | 8/2003 | Shane et al. | 426/332 |
| 6,733,379 B2 | * | 5/2004 | Tsang | 452/173 |
| 2002/0139385 A1 | * | 10/2002 | Gueret | 132/218 |
| 2003/0139129 A1 | | 7/2003 | Clarke | |

FOREIGN PATENT DOCUMENTS

| | | | |
|---|---|---|---|
| EP | 0118315 | * | 9/1984 |
| EP | 0121358 | | 10/1984 |
| FR | 2363993 | * | 5/1978 |

(Continued)

Primary Examiner—Peter M. Poon  
Assistant Examiner—David Parsley  
(74) Attorney, Agent, or Firm—Hall, Myers, Vande Sande & Pequignot

(57) ABSTRACT

Apparatus for de-feathering (i.e. picking or plucking) poultry. More particularly, picking apparatus employing a plurality of elongated picking elements which are resistant to cracking and/or micro-poring, and which are preferably flexible and/or bendable and which are of sufficiently low mass such as to decrease poundage yield loss (e.g. decrease fat loss and poultry wing damage). In some embodiments, apparatus is provided having a plurality of filaments rotatable about an axis for removing feathers from a poultry carcass.

29 Claims, 6 Drawing Sheets

FOREIGN PATENT DOCUMENTS

| | | | |
|---|---|---|---|
| FR | 2653302 | * | 4/1991 |
| FR | 2677523 | * | 12/1992 |
| GB | 2098454 | | 11/1982 |
| JP | 2203735 | | 8/1990 |
| WO | 9428731 | | 12/1994 |

* cited by examiner

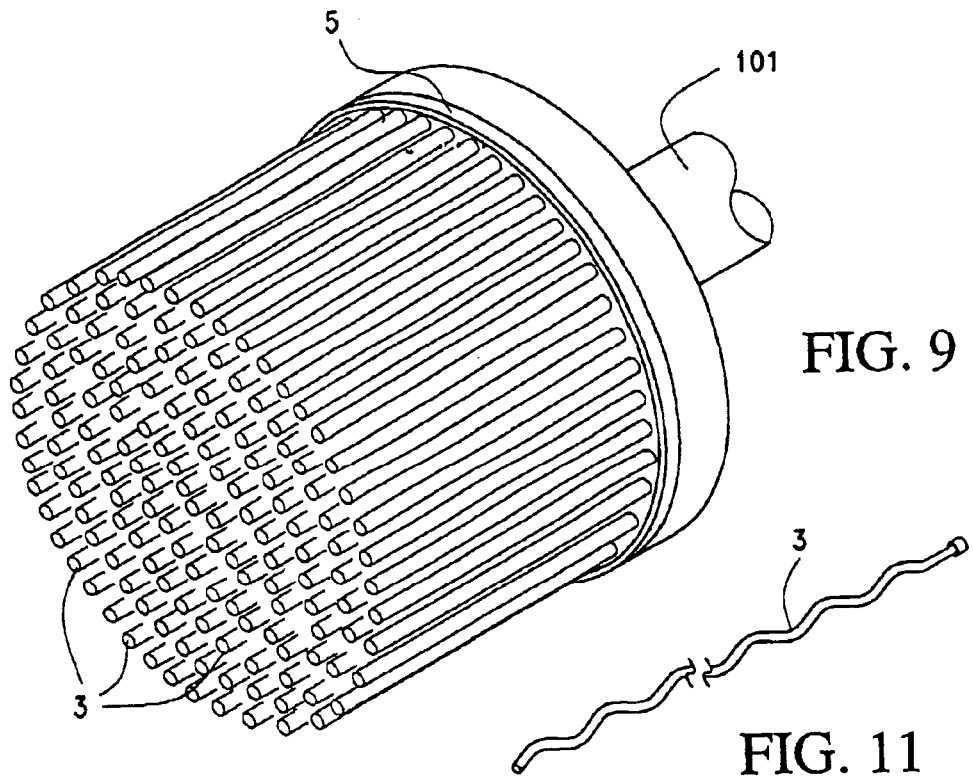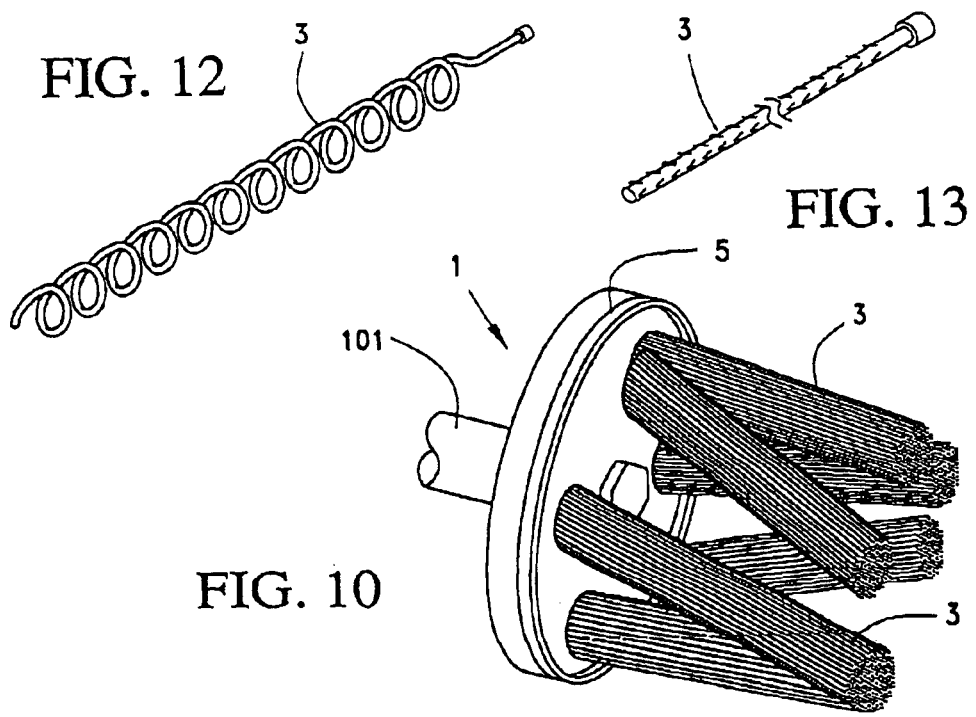

POULTRY DE-FEATHERING APPARATUS AND METHOD

FIELD OF INVENTION

This invention relates to apparatus for de-feathering (i.e. picking or plucking) poultry. More particularly, this invention relates to picking apparatus employing a plurality of elongated picking elements which are resistant to cracking and micro-poring, and which are preferably flexible and/or bendable and which are of sufficiently low mass so as to decrease poundage yield loss (e.g. decrease fat loss and poultry wing damage). In some embodiments, this invention relates to apparatus which employs a plurality of filaments rotatable about an axis for removing feathers from a poultry carcass.

BACKGROUND OF THE INVENTION

Throughout the world markets, approximately 73 million tons of poultry are raised, processed, and brought to market each year. In the United States alone, more than 17 million tons of poultry are raised and slaughtered for commercial sale annually.

For the vast majority of commercially raised poultry, the animals (e.g. chickens, turkeys, specialty hens, etc.) are raised by contract growers and then transported to processing facilities where the poultry is slaughtered and then processed for sale (e.g. de-feathered, eviscerated, and butchered). In typical, prior art de-feathering operations, the bird carcasses are first scalded with high temperature water (to aid in the removal of feathers) and then transported through a "picking" line. A conventional picking line, as is employed prolifically throughout the United States and the world, utilizes a conveying system by which poultry carcasses are carried between batteries of rotating disks or drums having rubber picking fingers extending therefrom. As the carcasses traverse the picking line, the rubber fingers strike the bird carcasses (as they rotate mounted on the rotating disks or drums) and bind the feathers, thereby removing them as the carcass continues its passage.

Although the prior art apparatus and process have been employed throughout the industry for many years, various drawbacks of the prior art have been discovered to exist. In this regard, the rubber picking fingers used for binding the feathers of the poultry during de-feathering operations (employed on the rotating disks and/or drums) are prone to cracking and/or forming microscopic holes (i.e. microporing) which can harbor bacteria. Because poultry carcasses passes through a picking line sequentially, if a given "finger" or set of "fingers" is contaminated, then it is possible that bacteria will be passed to each carcass which contacts that finger or set of fingers thereafter. For these reasons, strict operation guidelines have been established, in accordance with United States Department of Agriculture laws and regulations, to ensure that contamination of picking lines is minimized (so that contaminated meat is not sold to consumers). For example, in order to prevent and/or decrease contamination risk, typical industry guidelines mandate that the picking line be shut down periodically for cleaning (e.g. twice a day). During these cleanings, there is significant downtime in which poultry carcasses cannot be processed thus reducing plant efficiency. Furthermore, when bacteria penetrates cracks or pores in the rubber fingers, it is difficult and time consuming to complete adequate decontamination/sterilization using conventional methods.

As a further drawback, conventional rubber picking fingers are relatively large in diameter and thus have substantial mass per unit of length. For this reason, in a conventional picking line, prior art fingers strike poultry carcasses with considerable force and are prone to damaging the carcasses and/or reducing yield e.g. breaking the commercially valuable wings and/or causing the fat of the carcass to be expelled from beneath the skin of the bird. When fat is removed from the carcass, the effective yield of the carcass is decreased (i.e. because poultry is sold by weight). In fact, as much as ½ to 2 percent yield is lost due to picker finger design alone. In this regard, due to the shear volume of poultry processed, losses amounting to as little as ¼ percent yield have an economic impact to a processing plant which approaches millions of dollars per year.

In view of the above-enumerated drawbacks, it is apparent that there exists a need in the art for apparatus which overcomes the above drawbacks. It is a purpose of this invention to fulfill these needs in the art, as well as other needs which will become apparent to the skilled artisan once given the above disclosure.

SUMMARY OF THE INVENTION

Generally speaking, this invention fulfills the above described needs in the art by providing:

de-feathering apparatus comprising:

a plurality of elongating picking elements comprising structures selected from the group consisting of: filaments, fibers, bristles, wires, and substantially rigid threads.

In further embodiments, this invention provides:

a method of de-feathering poultry comprising:

rotating a plurality of elongated picking elements about an axis; and causing a poultry carcass to contact the rotating plurality of elongated picking elements;

the elongated picking elements comprising structures selected from the group consisting of: filaments, fibers, bristles, wires, and substantially rigid threads.

It is an objective of this invention to provide picking apparatus utilizing picking elements which are less susceptible to cracking and/or developing holes or micropores.

It is an additional objective of this invention to reduce bacterial proliferation in poultry processing.

It is a further objective of this invention to increase poultry processing plant production efficiency by increasing processing yields and/or decreasing operational downtime.

BRIEF DESCRIPTION OF THE DRAWINGS

FIG. 9 is a three-dimensional, perspective view of a further alternative embodiment of a de-feathering apparatus according to the subject invention illustrating a single cluster of picking elements extending therefrom.

FIG. 10 is a three-dimensional, perspective view of yet a further alternative embodiment of a de-feathering apparatus according to the subject invention illustrating a plurality a picking element clusters extending at angles from a rotatable disk.

FIG. 11 is a three-dimensional, perspective view of a picking element having a crimped configuration according to one embodiment of the subject invention.

FIG. 12 is a three-dimensional, perspective view of a picking element having a corkscrew configuration according to one embodiment of the subject invention.

FIG. 13 is a three-dimensional, perspective view of a linear picking element having a serrated surface according to one embodiment of the subject invention.

DETAILED DESCRIPTION OF CERTAIN EMBODIMENTS

For a more complete understanding of the present invention and advantages thereof, reference is now made to the following description of various illustrative and non-limiting embodiments thereof, taken in conjunction with the accompanying drawings in which like reference numbers indicate like features.

Figure 1:
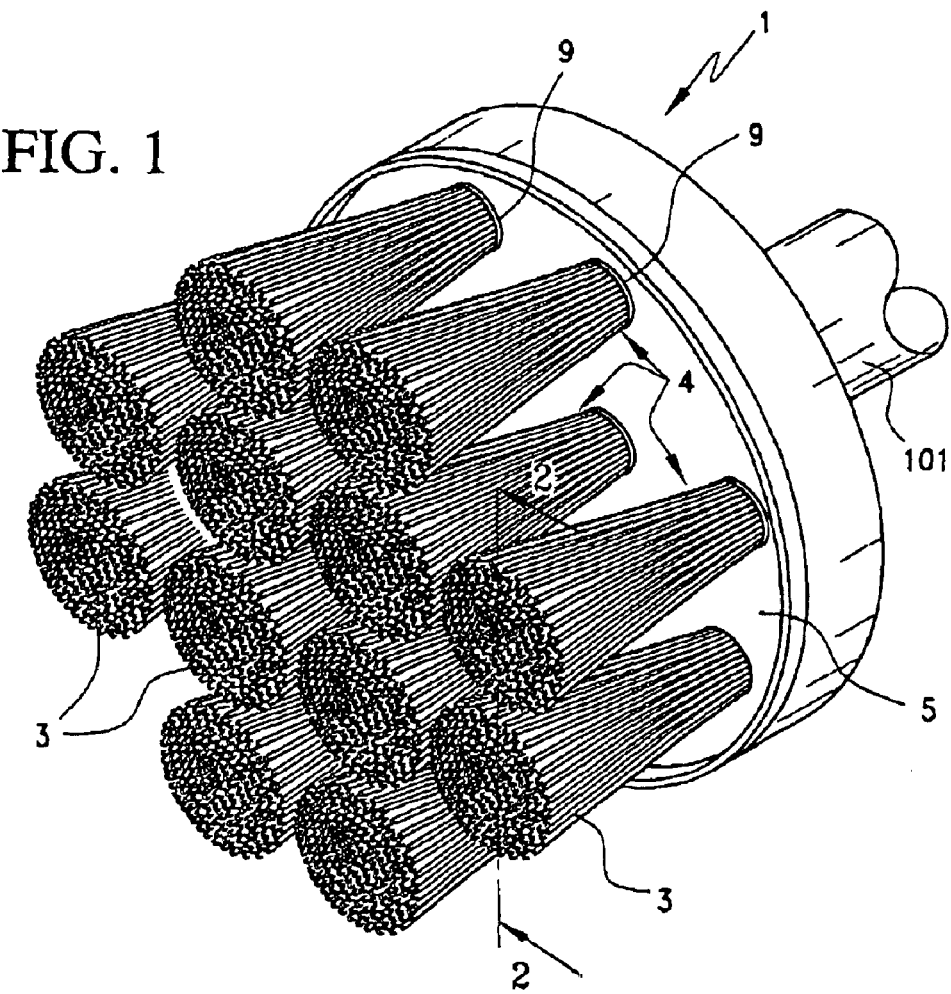
FIG. 1 is a three-dimensional, perspective view of one embodiment of a de-feathering apparatus according to the subject invention.
Figure 2:
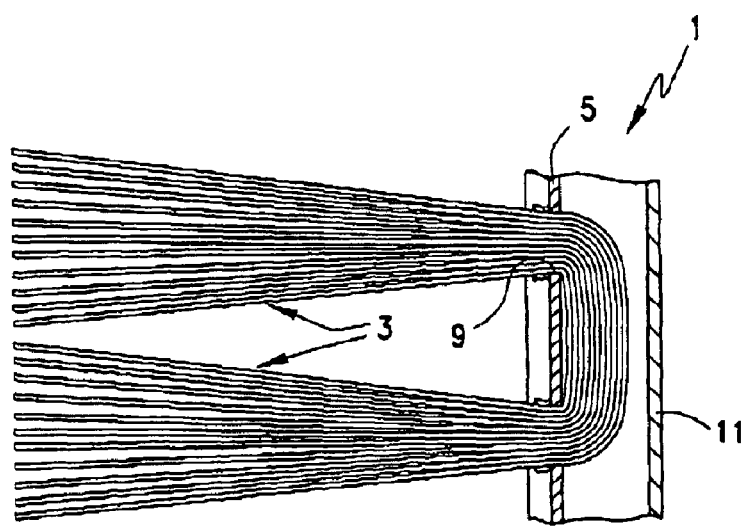
FIG. 2 is a partial, profile view of the embodiment illustrated in FIG. 1 with certain parts shown in x-ray.

Referring now initially to FIGS. 1 and 2, a particularly efficacious embodiment of a de-feathering apparatus according to the subject invention is illustrated therein. As illustrated, de-feathering apparatus 1 generally comprises a plurality of elongated picking elements 3 extending from a rotatable unit/disk 5 (e.g. a cylindrical metal disk having a plurality of apertures 9). As discussed in further detail below (in conjunction with a discussion of FIGS. 3 and 4), rotatable disk 5 is mountable on a rotatable shaft 101 of a motorized picking apparatus 100 so that picking elements 3 can be rotated to effect the removal of feathers from a poultry carcass when contacted therewith. In particular, when a picking element 3 is caused to impact a feather at a threshold velocity (while it is turning about an axis on rotatable disk 5), the feather wraps around a portion of the element 3, is bound thereby, and is subsequently removed as the picking element continues its rotation. In effect then, as multiple picking elements 3 contact multiple feathers on a poultry carcass, numerous feathers are removed with each disk 5 rotation.

In particularly well performing embodiments, picking elements 3, as illustrated, are extruded Nylon™ filaments arranged in bundles or clusters 4 (of approximately 50–150 filaments each, but more preferably between approximately 90–110 filaments each) so as to most efficiently effect feather removal. Although exhibiting highly desirable results, the use of extruded Nylon™ filaments, in particular, is not required to practice within the scope of the instant invention. Conversely, any element having the desirable qualities discussed herein may be employed as a substitute for the aforementioned filaments. In this regard, further discussion of the prior art drawbacks is warranted.

As aforesaid in the Background section above, the large mass per unit length of prior art rubber fingers contributes to several yield problems in known poultry processing facilities. More specifically, the relatively large mass of the thick, rubber, prior art "fingers" causes wing breakage as well as a reduction in poultry poundage yield due to fat expulsion which occurs during conventional picking operations employing such fingers. Still furthermore, cracking and micro-poring in conventional rubber fingers increases the risk of bacterial contamination as well as reduces processing factory operating time (i.e. because shutdowns for frequent equipment cleanings are necessary).

Therefore, in order to solve the aforementioned problems of the prior art, picking elements 3 are used in the subject invention as a unique and more effective and efficient substitute for prior art, rubber picking fingers. Examples of suitable structures for use as picking elements are filaments, fibers, bristles, wires, and/or substantially rigid threads. Although various variations of these materials and/or structures may be employed while practicing the subject invention, the selection of a specific picking element construction and/or structure may be determined employing one or a combination of important factors. For example, durability of the picking element material including resistance to cracking and micro-poring and/or hole formation is desired. Furthermore, a structure which has a mass per unit length which is substantially less than that of the rubber "fingers" employed in the prior art is desirable. This reduced mass is achieved through at least one but preferably through a combination of factors including shape and/or size selection including, but not limited to, element diameter and/or element length to diameter ratio selection (e.g. long, thin picking element structures are preferred). Other factors to consider when selecting materials and/or structures for picking elements 3 are the relative flexibility or relative stiffness of the material/structure, and whether or not the material/structure possesses a memory (i.e. the ability of the material to return to an original configuration after deflection).

Thus, although filaments, fibers, bristles, and/or substantially rigid threads are preferred embodiments of picking elements 3 of the subject invention, a strict definition of acceptable structures is not relied upon herein. Instead, any filament, fiber, bristle, thread and/or similar structure may be employed as a picking element as long as such structure exhibits the desired properties as enumerated herein. More specifically, in this regard, it is desired in preferred embodiments that the picking elements employed have relatively high length to diameter ratios and therefore low mass to unit length ratios. An exemplar range of length to diameter ratios is approximately 10:1 to 1000:1, more preferably approximately 20:1 to 500:1, and most preferably approximately 100:1 to 200:1. An exemplar range of effective element diameters is approximately 10–240 mils (1 mil=$\frac{1}{1000}^{th}$ of an inch). As a secondary feature, it is desired that the picking elements exhibit suitable durability characteristics (e.g. as described herein above). Any structure, comprised of any material, constructed according to the above guidelines may be employed as a picking element according to the subject invention.

Through various experimentation and testing, preferred materials have been determined as particularly advantageous when employed for poultry picking operations. Specifically, crystalline resin polymer filaments have demonstrated excellent de-feathering abilities as well as exhibited no visible cracking or poring. Substantially reduced losses in yield have been observed as well. In this regard, wing breakage is virtually eliminated and poundage yield loss is reduced by approximately ¼ to 2%.

Although many such filaments are commercially available from a variety of manufacturers, a particularly successful filament which has been tested is a Nylon™ filament manufactured by Dupont under the tradename Tynex 612. Preferred diameters for such filaments are between 10–240 mils. More preferred diameters are between 20–100mils with particular success being achieved in experimental practice with diameters selected from between 40–80 mils (most preferably approximately 60 mils).

In practice, Tynex 612 Nylon™ filaments have demonstrated at least most, if not all, of the above enumerated desired qualities and furthermore are known for their relative durability when exposed to high temperatures. Resistance to high temperatures, in this regard, is particularly important because large frictional forces are generated as the picking elements strike poultry carcasses and each other during picking operations.

Figures 3, 4:
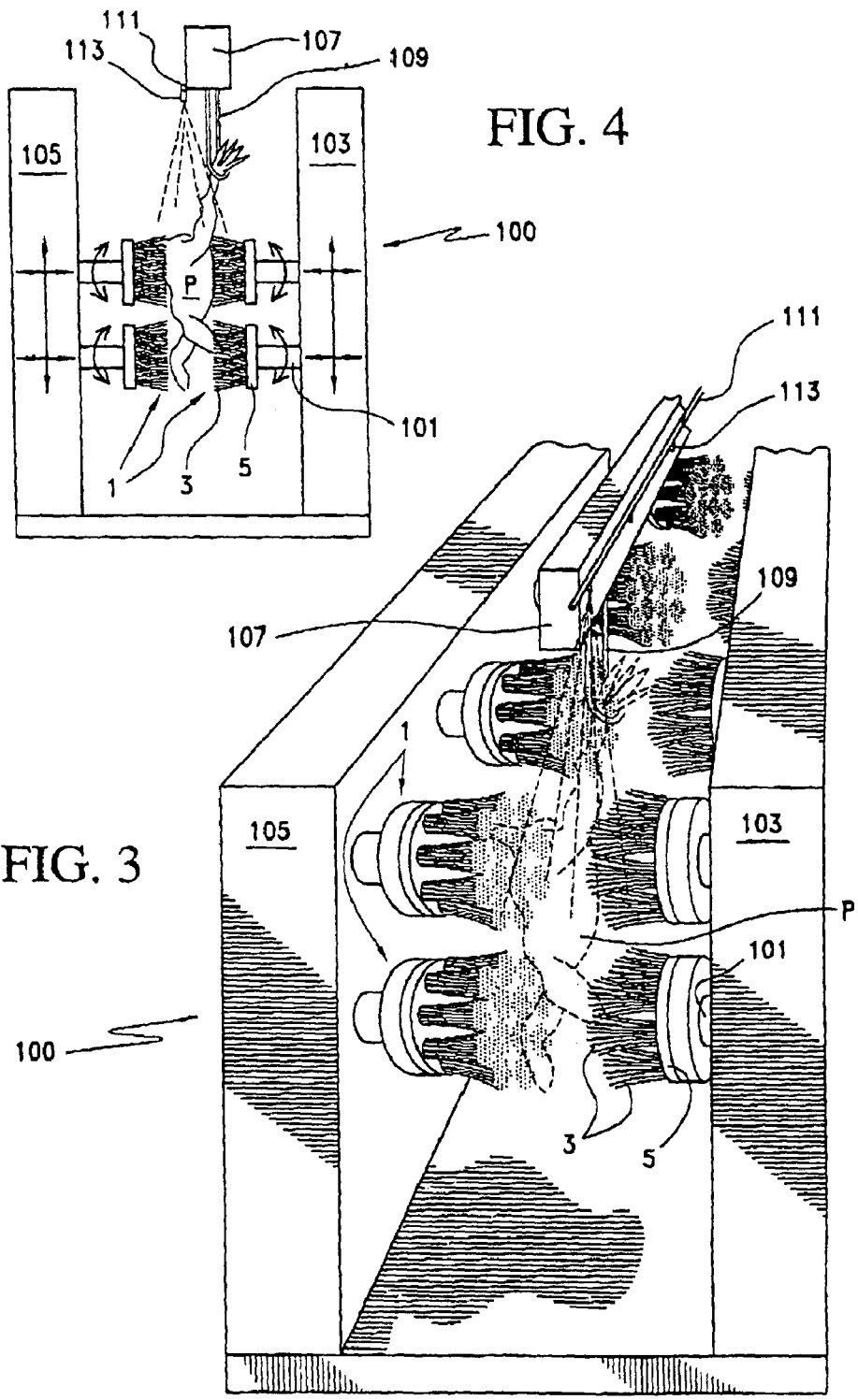
FIG. 3 is a three-dimensional, perspective view of a picking apparatus, illustrated in operation, employing banks of rotatable de-feathering units according to one embodiment of the subject invention.
FIG. 4 is an end view of the embodiment illustrated in FIG. 3 demonstrating the adjustability of the de-feathering units and picking apparatus according to one embodiment of the subject invention.

Turning now to FIGS. 3 and 4, the operation of de-feathering apparatus 1 on an exemplar motorized picking apparatus 100 is illustrated therein. As may be seen, picking apparatus 100 generally comprises a pair of parallel opposing frame members 103 and 105 each carrying a bank of rotatable disks 5 on rotatable shafts 101. Frame members 103 and 105 conventionally house motors (not shown) for driving the rotation of shafts 101 which in turn drive the rotation of disks 5. Because counter rotation of disks 5 located adjacent one another is generally preferred, individual motors may be provided for driving individual directions of rotation, or a serpentine belt-type arrangement may be employed to effect the same result (motors and belt not shown for sake of simplicity). Similarly, disks located opposite one another on opposite facing banks are preferably rotated in opposite directions from each other. Such a configuration reduces the tendency of carcasses to be "thrown" or "kicked".

As will further be noted, each rotatable disk 5 includes, extending therefrom, a bundle or bundles of picking elements 3 which rotate in conjunction with the rotation of disks 5. Therefore, in order to effect the de-feathering of a poultry carcass (e.g. chicken carcass "P" as illustrated), a carcass need only be passed through the space between the banks of disks 5 as they are rotated. In known practice, this is accomplished via a conventional conveying system 107 which includes a plurality of hangers 109 for hanging poultry carcasses by their feet. As conveying system 107 is operated, then, chicken carcass "P" is carried between rotating disks 5 and picking elements 3 are caused to strike the body and feathers of the carcass thus effecting a de-feathering or picking operation.

In preferred embodiments, disks 5 are rotated at between approximately 200–2000 RPM, and more specifically between approximately 300–1400 RPM. In more preferred embodiments, disks 5 are rotated between about 400–1200 RPM, and most preferably between about 700–900 RPM. The most preferred results have been achieved, in this regard, when disks are operated at speeds of approximately 850 RPM.

The number of columns and rows of disks 5 in each bank (on frame members 103 and 105) is selectable according to the size and design of de-feathering apparatus 1 employed (e.g. the size and/or shape of disks 5). In this regard, although FIG. 3 illustrates a picking apparatus 100 having two horizontal rows and four vertical columns of disks, other disk configurations and numbers may be employed. In particular, the number of columns and rows of rotatable units is normally selected according to the size and type of de-feathering apparatus 1 (i.e. the combination of picking elements 3 affixed to disks 5) which is installed on picking apparatus 100. For example, if smaller sized disks 5 are employed, 3–5 (or more) rows and 5–10 (or more) columns of disks may be utilized. Still furthermore, the orientation of rotatable units i.e. disks 5 is adjustable to adapt to the size of bird being "picked" (i.e. de-feathered). Likewise, the distance between frame members 103 and 105 is variable to accommodate various sizes of poultry carcasses i.e. in order to vary the size of the space between the banks of rotatable disks. FIG. 4, in this regard, illustrates the adjustability of apparatus 100 and rotatable disks 5 via a series of arrows indicating the various directions of pivotability and spacing adjustability. Alternative embodiments in which disks 5 are oriented in horizontal or other alternative configurations are, of course, contemplated (with elements 3 being oriented vertically, horizontally, or at angles).

Due to large frictional forces being generated during operation, unwanted heat is often produced as picking elements 3 strike poultry carcasses conveyed through the picking line. In order to prevent burning of the poultry, then, water line 111 is optionally provided and includes a plurality of spray jets 113 for delivering a stream or spray of water onto the picking elements and poultry carcasses during operation. In addition to providing a cooling effect, spray jets 113 wet the poultry feathers, and in some instances, thereby aid in their removal (by rendering them more easily gripped by picking elements 3). Spray jets 113 are preferably located proximal each column of rotatable disks 5.

Referring now to FIGS. 5–13, various additional and non-limiting embodiments of de-feathering apparatus 1 and their associated picking elements 3 are illustrated therein. For example, although FIGS. 1 and 2 illustrate picking elements 3 being woven through apertures 9 of a cylindrical rotatable disk 5 (preferably with a sealing cap 11 installed on the back of the disk to prevent passage of materials through the apertures in either direction e.g. feathers, poultry effluent, waste water, grease, etc.), variations of this specific de-feathering apparatus design are contemplated.

Figure 5:
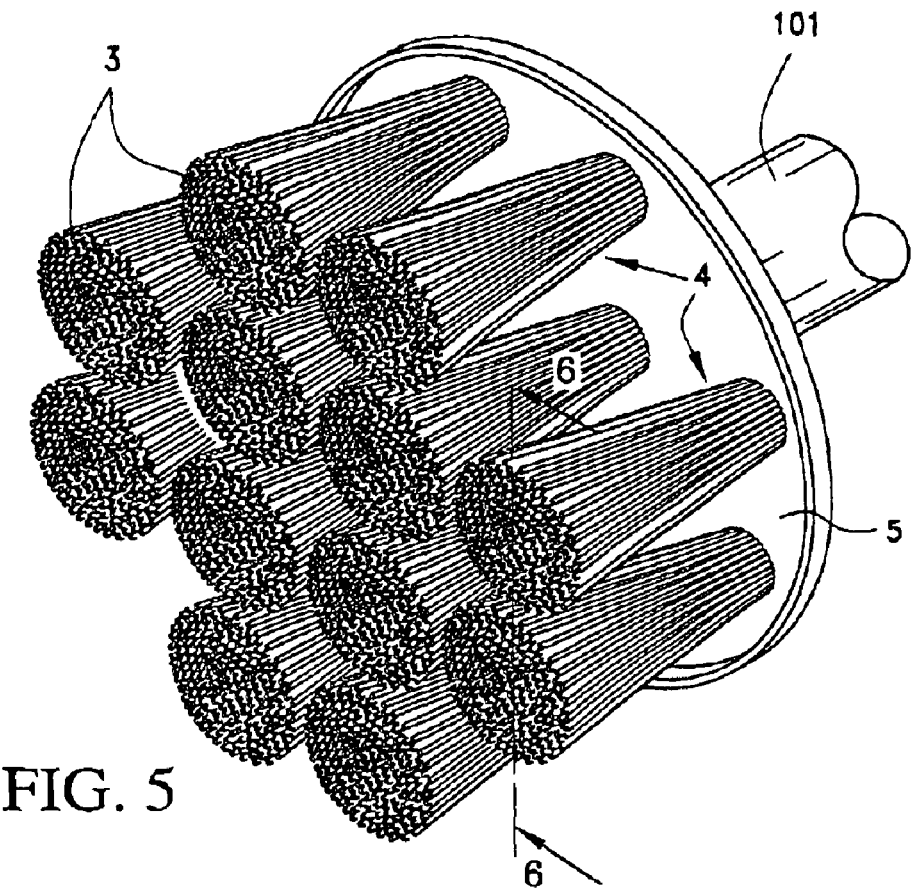
FIG. 5 is a three-dimensional, perspective view of an alternative embodiment of a de-feathering apparatus according to the subject invention.
Figure 6:
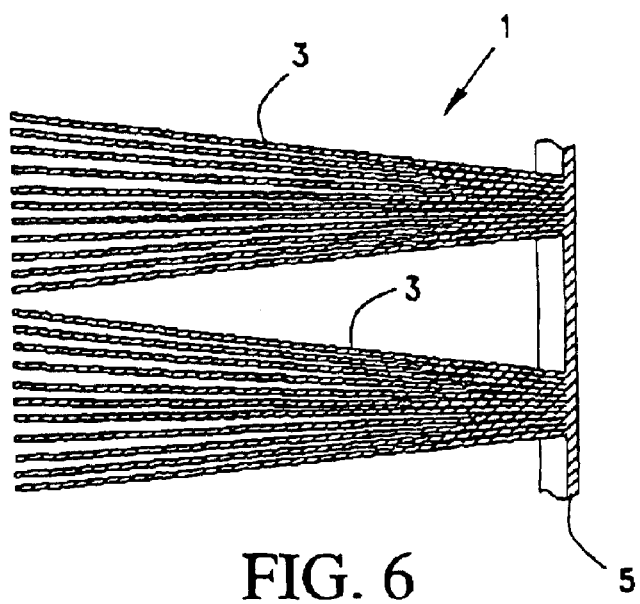
FIG. 6 is a partial, profile view of the embodiment illustrated in FIG. 5 with certain parts shown in x-ray.

In particular, FIGS. 5 and 6 illustrate a design in which picking elements 3 are molded to disk 5 rather than being woven thereto.

Figure 7:
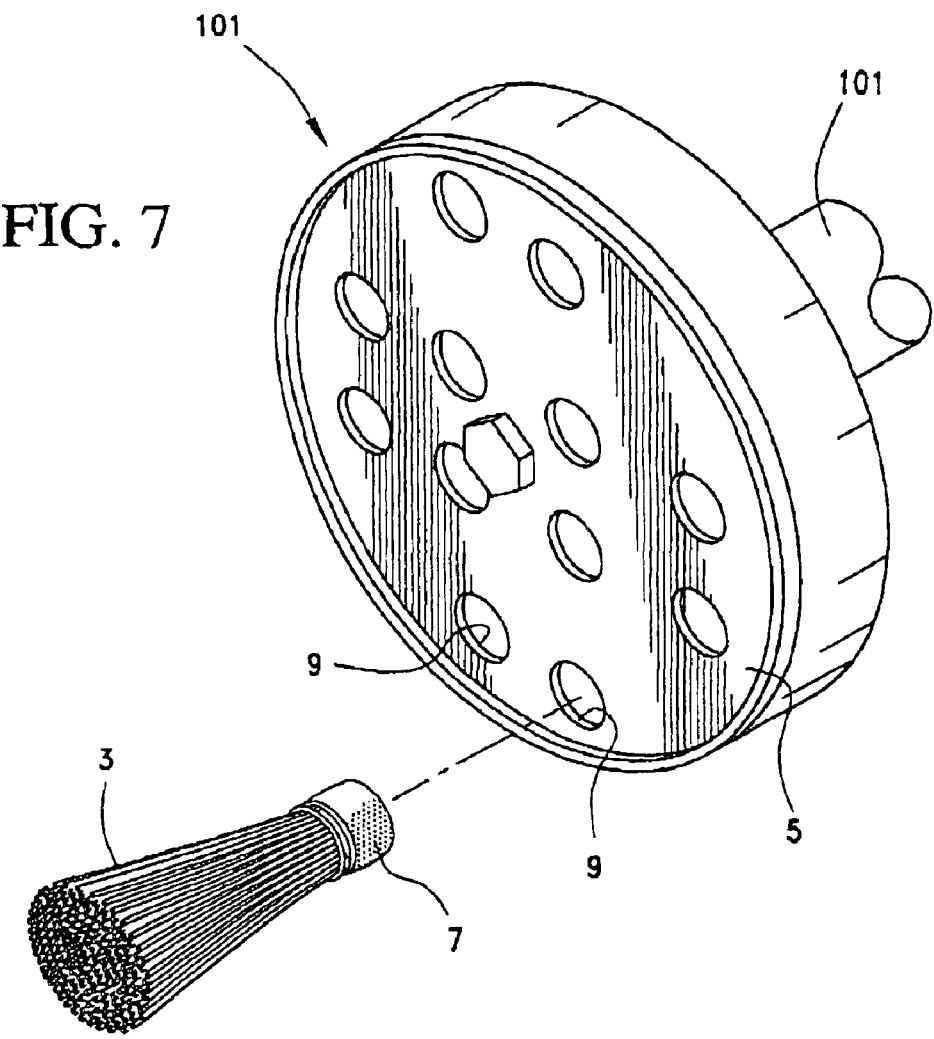
FIG. 7 is a three-dimensional, perspective view of one embodiment of a de-feathering apparatus plug unit and rotatable disk according to one embodiment of the subject invention.
Figure 8:
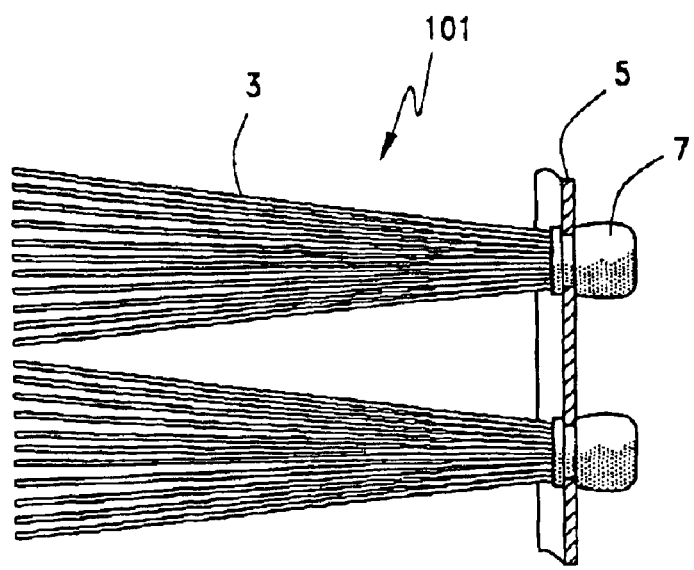
FIG. 8 is a partial, profile view of the embodiment illustrated in FIG. 7 with certain parts shown in x-ray.

FIGS. 7 and 8 illustrate picking elements 3 being molded to a plug unit 7. Plug unit 7 is preferably a rubber or urethane-like plug which is selectively matable to apertures 9 of disk 5. In this manner, picking elements 3 can be readily interchanged/replaced when worn, for example, by simply "unplugging" an existing set of picking elements, and "plugging in" a new set.

FIG. 9 illustrates a disk 5 in which a single, uniform bundle of picking elements 3 is employed rather than a plurality of spaced apart bundles.

FIG. 10 illustrates an embodiment in which bundles of picking elements 3 extend at angles from rotatable disk 5 rather than perpendicularly therefrom. An exemplar set of angles, in this regard, may be selected from between approximately 45–90 degrees relative to the face of the disk.

Figure 15:
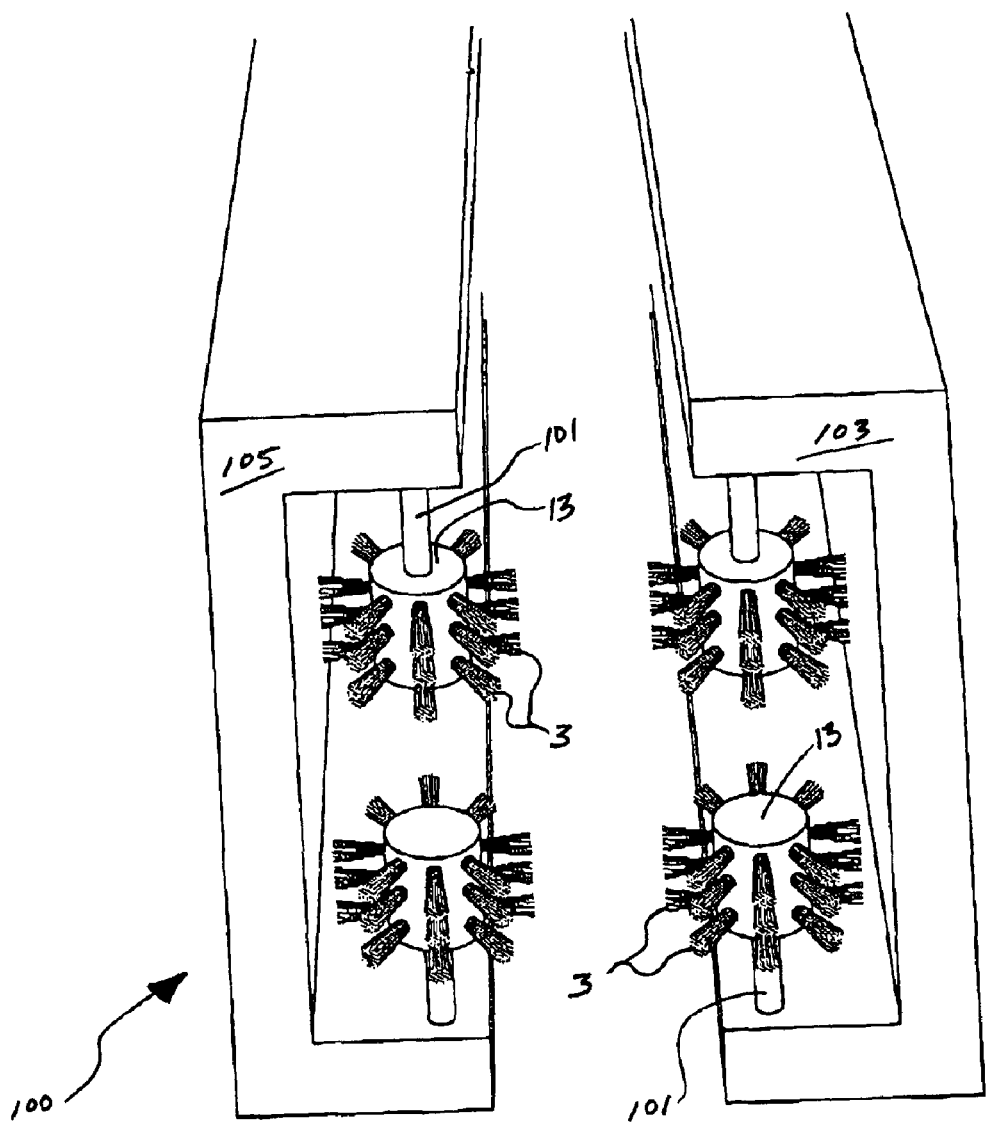
FIG. 15 is a three-dimensional, perspective view of a picking apparatus, illustrated in operation, employing banks of rotatable de-feathering drums according to one embodiment of the subject invention.

FIG. 15 illustrates an embodiment in which elements 3 are attached to a rotatable drum 13 (i.e. as an alternative to a disk). As when employing rotatable disks, such drums can be employed in horizontal orientations, vertical orientations, mounted at angles, or mounted in any combination of such configurations.

Figure 14:
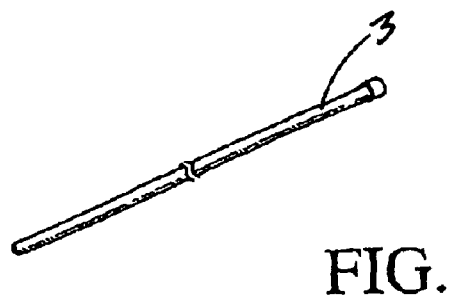
FIG. 14 is a three-dimensional, perspective view of a linear picking element having a substantially rounded tip according to one embodiment of the subject invention.

In still further embodiments, variations on the linear, substantially cylindrical design of individual picking elements 3 may be employed. FIG. 11, in this regard, illustrates a picking element 3 having a crimp or wave-type pattern extending along the majority of its length. FIG. 12 illustrates picking element 3 having a corkscrew configuration. FIG. 13 illustrates a picking element having serrations along its circumferential surface. FIG. 14 illustrates a linear picking element having a rounded tip.

In yet further embodiments, various additional designs of picking elements 3 are, of course, contemplated. Such element designs are not limited to cylindrical shapes but, in fact, may be square, pentagonal, hexagonal, heptagonal, octagonal, or similar configurations (e.g. or simply asymmetrical in cross-section).

Once given the above disclosure, many other features, modifications, and improvements will become apparent to the skilled artisan. Such other features, modifications, and improvements are therefore considered to be part of this invention, the scope of which is to be determined by the following claims:

What is claimed is:

1. De-feathering apparatus comprising:
   a plurality of elongating picking elements comprising structures selected from the group consisting of: filaments, fibers, bristles, wires, and substantially rigid threads, said elements consist essentially of a material which has a mass per unit length which is substantially less than rubber;
   said picking elements having first and second ends and coupled first ends being affixed to at least a first rotatable unit connected to a motor driven system for causing rotation of said rotatable unit and which is functionally installed on a motorized picking apparatus comprising:
   a first bank of rotatable units having a plurality of said picking elements affixed thereon; and
   a second bank of rotatable units having a plurality of said picking elements affixed thereon, said second bank of rotatable units located so as to be spaced apart from and substantially opposite said first bank of rotatable units such that said first and said second banks of rotatable units define a space therebetween for passage of a line of poultry therethrough;
   and each of said first and second banks of rotatable units including a plurality of disks comprising first and second outer walls defining a hollow interior space there between, one of the first and second outer walls including a plurality of apertures, the picking elements extending through one of the apertures and into the hollow interior space, then extending out of another of the apertures to form a portion of the picking elements not inside the hollow interior space.

2. De-feathering apparatus according to claim 1 wherein said picking elements have a length to diameter ratio of at least approximately 10:1.

3. De-feathering apparatus according to claim 2 wherein said picking elements have diameters selected from between 10 and 240 mils.

4. De-feathering apparatus according to claim 3 wherein said picking elements are comprised of a crystalline resin polymer base material.

5. De-feathering apparatus according to claim 4 wherein said picking elements are comprised of a nylon base material.

6. De-feathering apparatus according to claim 1 wherein said first bank and said second bank of rotatable units rotate in opposite directions one from the other.

7. De-feathering apparatus according to claim 6 wherein adjacently located rotatable units are constructed so as to rotate in opposite directions one from the other.

8. De-feathering apparatus according to claim 6 wherein said first and said second banks of rotatable units each include at least two rows and at least four columns of rotatable units.

9. De-feathering apparatus according to claim 6 wherein each rotatable unit in said first and second banks of rotatable units is connected to a motor driven system for causing rotation of said rotatable unit at a rate selected from between 200 and 2000 revolutions per minute.

10. De-feathering apparatus according to claim 9 wherein each said rotatable unit of said first and said second banks of rotatable units is adjustable in orientation thereby to provide tailorability of said motorized picking apparatus for de-feathering multiple sizes of poultry.

11. De-feathering apparatus according to claim 10 wherein said space between said first and said second banks of rotatable units is adjustable in size.

12. De-feathering apparatus according to claim 11 further including a fluid line having at least one fluid jet for providing a water spray source to said first and said second banks of rotatable units.

13. De-feathering apparatus according to claim 1 wherein said picking elements are affixed to said rotatable units in closely packed clusters.

14. De-feathering apparatus according to claim 13 wherein each said rotatable unit comprises a rotatable disk and includes a plurality of picking element clusters spaced apart one from another, each said picking element clusters comprising approximately 50–150 picking elements.

15. De-feathering apparatus according to claim 14 wherein said plurality of picking element clusters extend substantially perpendicularly from a face of said rotatable disk.

16. De-feathering apparatus according to claim 14 wherein said plurality of picking element clusters extend at angles selected from between 45–90 degrees from a face of said rotatable disk.

17. De-feathering apparatus according to claim 1 wherein said picking elements are crimped along a substantial portion of their length.

18. De-feathering apparatus according to claim 1 wherein said picking elements are serrated along a substantial portion of their length.

19. De-feathering apparatus according to claim 1 wherein said picking elements are crimped along a substantial portion of their length and are comprised of a crystalline resin polymer base material.

20. De-feathering apparatus according to claim 1 wherein said picking elements are corkscrewed along a substantial portion of their length.

21. De-feathering apparatus according to claim 1 wherein said picking elements are tapered along a substantial portion of their length.

22. De-feathering apparatus according to claim 1 wherein said picking elements have substantially rounded tips.

23. A method of de-feathering poultry by using the apparatus according to claim 1, said method comprising:
   rotating said plurality of elongated picking elements about an axis; and causing a poultry carcass to contact said rotating plurality of elongated picking elements;

said elongated picking elements comprising structures selected from the group consisting of: filaments, fibers, bristles, wires, and substantially rigid threads.

24. A method of de-feathering poultry according to claim 23 wherein said picking elements having a length to diameter ratio of at least approximately 10:1.

25. A method of de-feathering poultry according to claim 24 wherein said picking elements have diameters selected from between 10 and 240 mils.

26. A method of de-feathering poultry according to claim 25 wherein said picking elements are comprised of a crystalline resin polymer base material.

27. A method of de-feathering poultry according to claim 26 wherein said picking elements are comprised of a nylon base material.

28. A method of de-feathering poultry according to claim 23 further including passing a poultry carcass between opposing banks of rotating units having picking elements extending therefrom.

29. A method of de-feathering poultry according to claim 28 further including causing oppositely facing rotating units to counter rotate one with respect to the other.

* * * * *